(12) United States Patent
Tien et al.

(10) Patent No.: US 6,381,452 B1
(45) Date of Patent: Apr. 30, 2002

(54) MULTIFUNCTION NEW-TYPE AUDIO PLAYER STRUCTURE

(76) Inventors: Ting-Kuei Tien; Hsi-Chieh Lee; Lina Chi; Huang-Sui Lai, all of 18F-2, No. 2, Lane 175, Sec. 3, Shiou-Lang Road, Chung-Ho City, Taipeu Hsien 235 (TW)

( * ) Notice: Subject to any disclaimer, the term of this patent is extended or adjusted under 35 U.S.C. 154(b) by 0 days.

(21) Appl. No.: 09/431,955

(22) Filed: Nov. 1, 1999

(51) Int. Cl.[7] .................................................. H04Q 7/06
(52) U.S. Cl. ...................... 455/344; 455/3.06; 455/424; 455/128; 455/514
(58) Field of Search ............................ 455/424, 45, 39, 455/3.06, 568, 344; 381/67; 704/270, 272, 278; 369/6, 7

(56) References Cited

U.S. PATENT DOCUMENTS

| 6,044,699 | A | * | 4/2000 | Greenblatt et al. ...... 73/170.17 |
| 6,076,063 | A | * | 6/2000 | Unno et al. .................. 704/500 |
| 6,093,880 | A | * | 7/2000 | Arnalds ..................... 84/464 R |
| 6,192,340 | B1 | * | 2/2001 | Abecassis ................ 455/185.1 |
| 6,199,076 | B1 | * | 3/2001 | Logan et al. ................ 434/319 |
| 6,212,555 | B1 | * | 4/2001 | Brooks et al. ................. 381/86 |
| 6,278,976 | B1 | * | 8/2001 | Kochian ................ 379/101.01 |

FOREIGN PATENT DOCUMENTS

GB        2121649 A  *  12/1983

* cited by examiner

*Primary Examiner*—Thanh Cong Le
*Assistant Examiner*—Yemane Woldetatios

(57) ABSTRACT

A multifunction new-type audio player structure which in addition to a vehicle audio system can be utilized with ordinary radios, mobile telephones, and wireless transceivers. The audio recording section of the present invention stores music in a computer compressed format in a memory device and then the memory device is placed in a radio wave controller and conveyed by normal radio wave transmission for reception by a vehicle audio system, mobile telephone, or wireless transceiver to achieve upgraded audio performance.

1 Claim, 5 Drawing Sheets

MULTIFUNCTION NEW-TYPE AUDIO PLAYER STRUCTURE

BACKGROUND OF THE INVENTION

1) Field of the Invention

The invention herein relates to a multifunction new-type audio player structure.

2) Description of the Prior Art

Conventional vehicle audio system equipment usually consists of a only an audio tape player structure and when the vehicle audio system is upgraded, it must be removed and the new product installed. In view of the shortcomings associated with vehicle audio systems, the inventor of the invention herein developed the multifunction new-type audio player of the present invention.

SUMMARY OF THE INVENTION

In the design concept of the invention herein, music is stored in a memory device inside a controller and then the music is converted into radio waves and, furthermore, transmitted by a radio wave encoder, transmitter, and tuner device all contained in the controlled for reception by a vehicle audio system, radio, mobile telephone, or wireless transceiver. Music stored in the memory device of the invention herein can be sourced by a computer telecommunications interface with a network or from a compact disk.

The brief description of the drawings below is followed by the detailed description of the preferred embodiments.

DETAILED DESCRIPTION OF THE PREFERRED EMBODIMENTS

Figure 1:
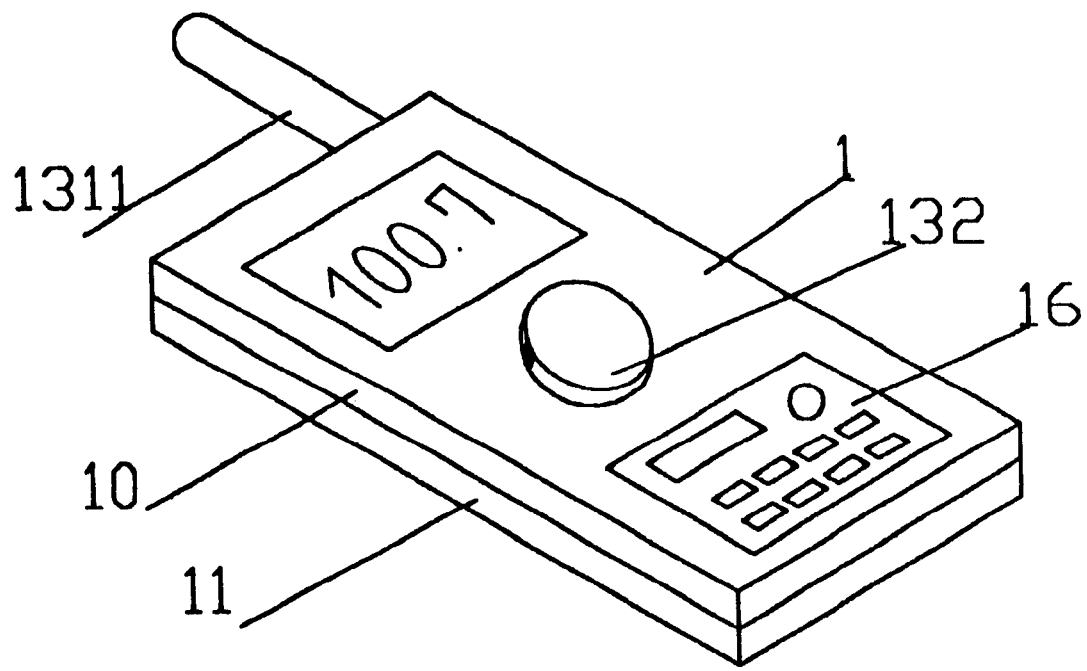
FIG. 1 is an isometric drawing of the controller of the invention herein.
Figure 2:
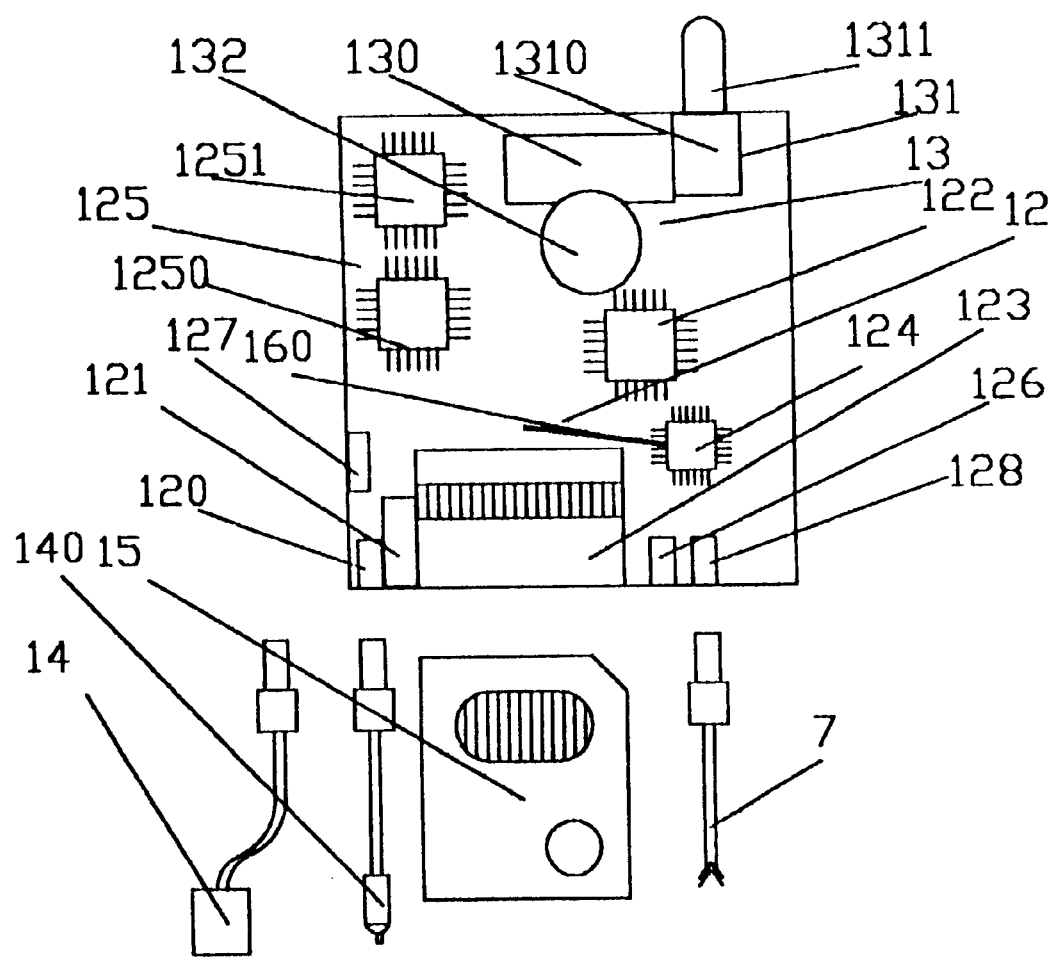
FIG. 2 is a cross-sectional drawing of the controller of the invention herein.

The appearance of the controller 1 of the invention herein (as indicated in FIG. 1) resembles the shape of a typical cellular telephone, but the major claims regarding the structure and functions (as indicated in FIG. 2) are as follows:

The overall structure of the controller 1 is comprised of an upper case half 10, a lower case half 11, a circuit device 12, a radio wave device 13, an AC adapter 14, a memory card 15, and a controller panel 16.

Of which, the upper case half 10 is situated on the lower case half 11 and the circuit device 12 as well as the radio wave device. 13 are disposed at the upper extent, with a laterally disposed opening at the center facilitating the installation of the circuit device 12 and the radio wave device 13 inside, and a semicircular opening is formed in one side of the upper case half 10 to permit the exposure of the radio wave device 13 transmitting antenna 1311 outside the controller 1; the structure and function of the lower case half 11 is identical to that of the upper case half 10 as both keep dust from and protect the circuit device 12 and radio wave device 13 by forming an enclosing structure having a laterally situated semicircular hole.

The circuit device 12 consists of a power supply socket 120 or a battery 121 along with internal memory 122, an external memory card connector slot 123, a controller panel connector structure 124, a controller structure 125, an headphone jack 126, a multiple-contact jumper switch 127, and a microphone jack 128.

Of which, the AC adapter 14 via the power supply socket 120, automotive lighter plug 140, or battery 21 serve as the electric power source required during audio recording and playback; the external memory card connector slot 123 is utilized to enslot an external memory card 15, and the internal memory 122 alone or in conjunction with the external memory card 15 enslotted in the external memory card connector slot 123 holds data which is transmitted as signals to the controller structure 125, with the data stored in the internal memory 122 or the external memory card 15 inputted to the radio wave device 13, then the audio data is outputted from the transmitting antenna 1311 of the radio wave device 13, received by the vehicle audio system 8 (or radio), and played as music from the speakers of the vehicle audio system 8.

Another auxiliary structure of the invention herein is the controller panel connection structure 124 which is wired to the controller panel 16 via the signal leads 160 to facilitate switching and selection functions from the controller panel 16; the controller structure 125 is largely a mainboard consisting of an audio decoder IC 1250, a controller IC 1251, and other components that convert the data stored in the memory into audio and transfers it to the radio wave device 13, with the headphone jack 126 and the multiple-contact jumper switch 127 enhancing operation and utilization.

The memory card 15 and the radio wave device 13 that operate in conjunction with the circuit device 12 and other internal components are instrumental in achieving the structural and major functions of the present invention, of which there is internal memory 122 in addition to the memory on the external memory card 15; furthermore, the radio wave device 13 consists of three main sections: a radio wave encoder 130, a transmitter 131, and a tuner 132; the radio wave encoder device 130 receives through the circuit structure transfers of the music data stored in the external memory card 15 or internal memory 122 and, furthermore, encodes the data for radio wave transmission, then it is inputted to the transmitter base 1310 of the transmitter structure 131 and conveyed from the transmitter base 1310 to the transmitting antenna 1311, where the signal is broadcast as a radio wave; the radio wave device 13 of the invention herein is also equipped with tuner device 132 to adjust the radio wave carrier frequency of the converted music data.

Figure 3:
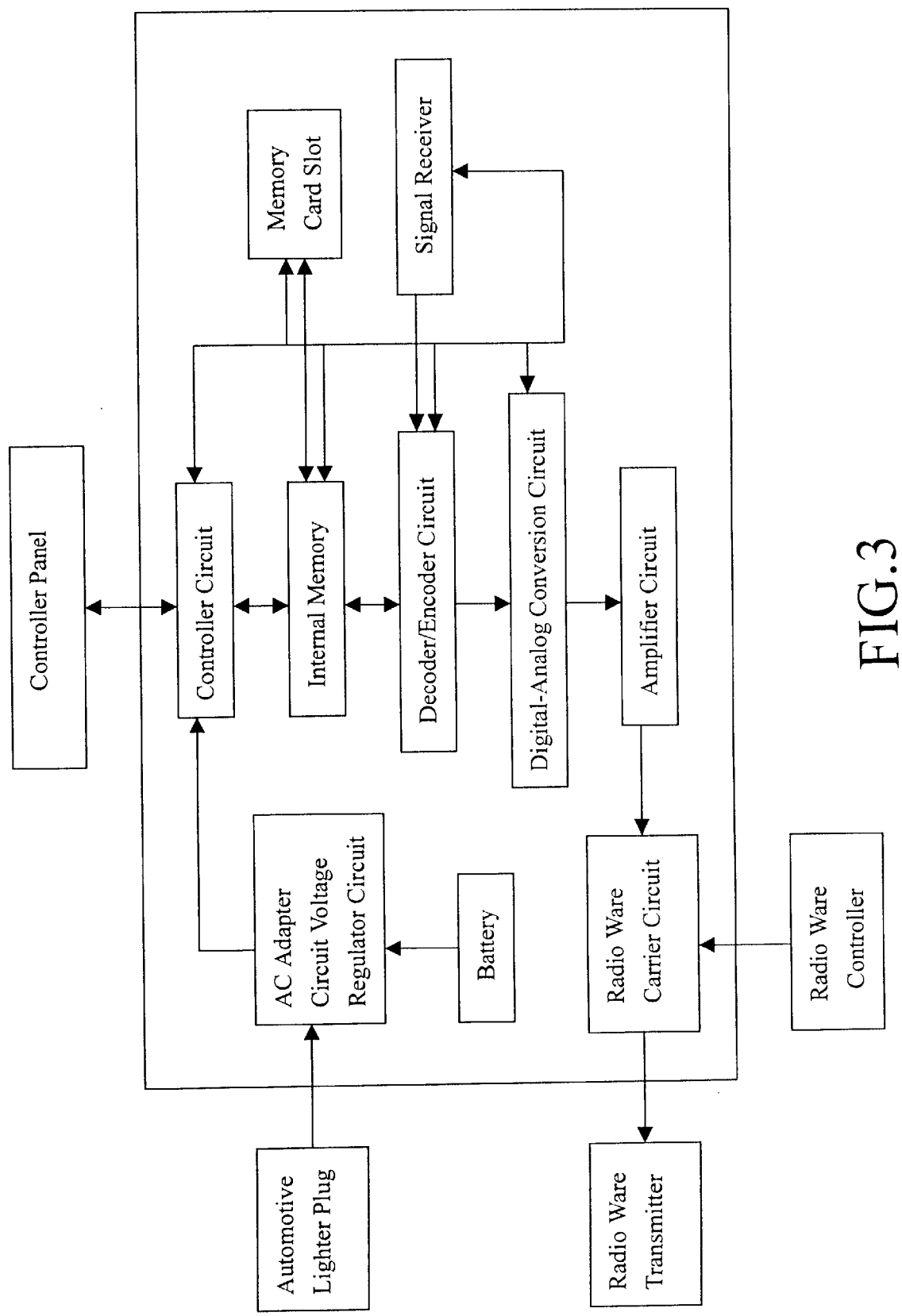
FIG. 3 is a block diagram of the audio data player embodiment of the invention herein.
Figure 4:
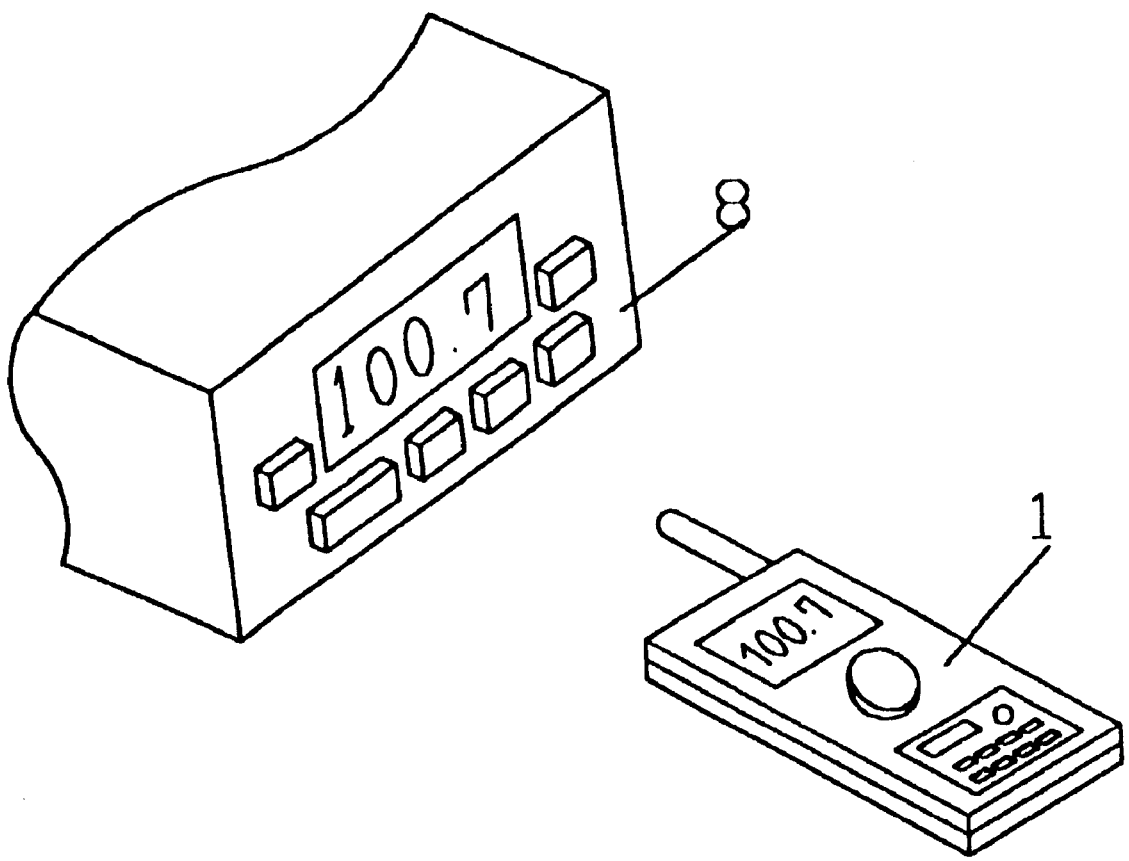
FIG. 4 is an isometric drawing of the audio data player embodiment of the invention herein.

The playing method of the invention herein (as shown in FIG. 4) consists of switching on the AC adapter 14 of the multifunction new-type audio player structure and utilizing the tuner device 132 to set the radio wave channel at which the converted music data stored in the external memory card or internal memory 122 will be transmitted as a radio wave from the transmitting antenna 1311 and, furthermore, received by the radio of the vehicle audio system 8, all in manner similar to the relationship utilized between a typical radio and transmission station to enable the enjoyment of the broadcasted music; furthermore, the playing process and performance of the invention herein (as indicated in FIG. 3) utilizes the AC adapter 14, automotive lighter plug 140, or battery 121 to supply the controller 1 the electrical power required during playing operation, when the signal of the musical format stored in the internal memory 122 or the external memory card 15 inserted in the external memory card connector slot 123 is conveyed through the signal leads 160 to the controller structure 125, then the signal is conveyed through the encoding and decoding circuits of the audio decoder IC 1250 and the controller IC 1251 in the controller structure 125, after which the signal is passed to a digital-analog conversion circuit and amplifier circuit, and finally the signal reaches the radio wave device 13, and is received by the radio or vehicle audio system, mobile telephone, transceiver, or other signal receiving device to which the music was transmitted; additionally, the controller 1 is connected to the external controller panel 16 via the controller panel connection structure 124 and the signal leads 160 to thereby provide convenient song selection functions and, furthermore, the independent setting of the order or selection of the music to be played.

Figure 5:
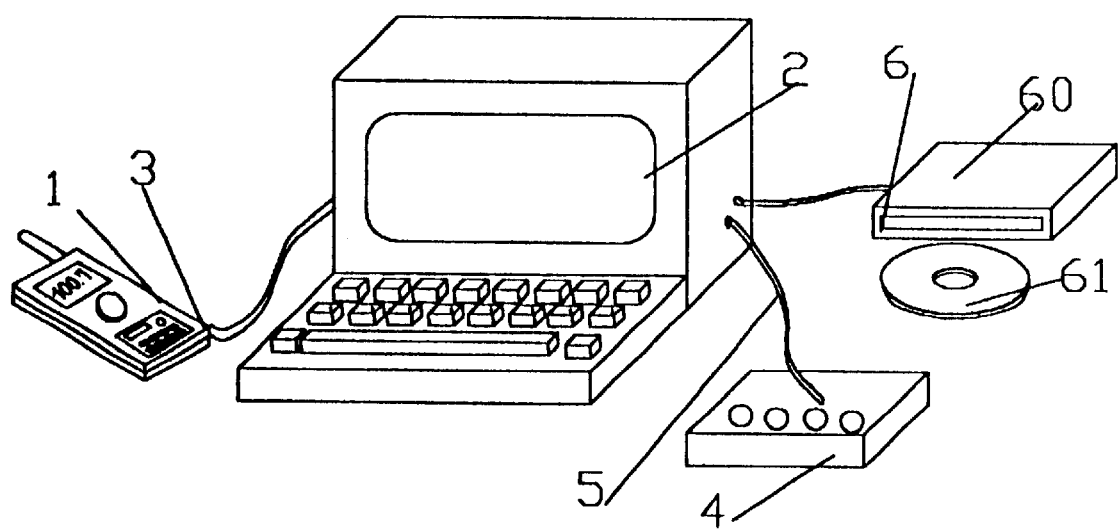
FIG. 5 is an isometric drawing of the data transmission structure embodiment of the invention herein.

The audio reception process of the invention herein (as shown in FIG. 5) consists of downloading the desired music from the network 4 via the telephone cable 5 or downloading it from the optical disk 61 mounted in the optical disk drive 60, and then computer 2 and its operating software environment interface card 3 converts the music signal into a compressed format and downloads it into the internal memory 122 or external memory card 12; the user can also simultaneously download audio from both the network 4 and the CD-ROM disk system 6 if desired; and the recording process (as shown in FIG. 2) of the invention herein can also be accomplished with an external microphone structure 7 through which music is directly inputted and, furthermore, stored in a compressed format in the internal memory 122 or the external memory card 15.

What is claimed is:

1. A multifunction new-type audio player structure comprised of a controller and its internal components, an upper case half, a lower case half, a circuit device, a radio wave device, and other components, of which:

the said upper case half is an enclosing structure having a laterally disposed opening extending inward and a semicircular opening formed in one side of the said upper case half, the said lower case half is structurally similar to the said upper case half, except that the said circuit device and the said radio wave device are situated on the lower extent of the said upper case half.

the said circuit device consists of a power supply socket or a battery along with internal memory, an external memory card connector slot, a controller panel connection structure, and a controller structure, of which: the said power supply socket can be connected to an external AC adapter or automotive lighter plug; the said external memory card connector slot is utilized to enslot an external memory card, and music data can be recorded into the said internal memory and the said external memory card inserted in the said external memory card connector slot and, furthermore, the signal conveyed into the said internal memory or the said external memory card inserted in the said external memory card connector slot is converted by the said controller structure from an analog audio signal transmitted wirelessly from the said radio wave device into digital data in the said internal memory or the said memory card; a controller panel connection structure is wired to a controller panel 16 via signal leads; and the controller structure is largely a mainboard consisting of an audio decoder IC, a controller IC and other components.

the said radio wave device is connected to the controller device and, furthermore, consists of three main sections: a radio wave encoder, a transmitter, and a tuner, wherein the said radio wave encoder device receives the music data and, furthermore, encodes the data for the transmitting channel and then it is inputted to a transmitter base of transmitter structure and conveyed from the said transmitter base to a transmitting antenna, where the signal is broadcast as a radio wave; and the said radio wave device of the invention herein is also equipped with a tuner device to adjust the channel frequency of the music signal.

* * * * *